United States Patent [19]

Muroi

[11] 4,186,775
[45] Feb. 5, 1980

[54] WATER HAMMER SHOCK ABSORBER

[75] Inventor: Sankichi Muroi, Matsudo, Japan

[73] Assignee: Tozen Sangyo Co., Ltd., Tokyo, Japan

[21] Appl. No.: 918,726

[22] Filed: Jun. 26, 1978

Related U.S. Application Data

[63] Continuation of Ser. No. 728,730, Oct. 1, 1976, abandoned.

[30] Foreign Application Priority Data

Oct. 7, 1975 [JP] Japan .............................. 50-121143

[51] Int. Cl.² .......................................... F16L 55/04
[52] U.S. Cl. .......................................... 138/30; 138/26
[58] Field of Search .......................... 138/30, 26, 40; 220/85 B; 137/207, 568, 593

[56] References Cited

U.S. PATENT DOCUMENTS

| 874,517 | 12/1907 | Lowry | 138/40 |
|---|---|---|---|
| 2,875,780 | 3/1959 | Pier | 138/30 |
| 2,949,932 | 8/1960 | Hewitt | 138/30 X |
| 3,063,470 | 11/1962 | Forster | 138/30 |
| 3,115,210 | 12/1963 | Birk | 138/30 X |
| 3,331,399 | 7/1967 | Von Forell | 138/30 |
| 3,625,242 | 12/1971 | Ostwald | 138/30 |
| 3,628,573 | 12/1971 | Loliger | 138/30 |
| 3,722,548 | 3/1973 | Mercier | 138/30 |
| 3,744,527 | 7/1973 | Mercier | 138/30 |
| 3,893,485 | 7/1975 | Loukonen | 138/30 |

Primary Examiner—Richard E. Aegerter
Assistant Examiner—James E. Bryant, III
Attorney, Agent, or Firm—Watts, Hoffmann, Fisher & Heinke Co.

[57] ABSTRACT

A water hammer shock absorber comprising a casing provided on both side walls thereof with a hole and innerside thereof with a cavity adapted to have a pressurized gas sealed therein, a pipe having number of small perforations defined on the peripheral wall thereof between said hole of the casing, and an elastic tube covering the periphery of said pipe being fitted thereto in a watertight fashion.

4 Claims, 3 Drawing Figures

WATER HAMMER SHOCK ABSORBER

This is a continuation of application Ser. No. 728,730, file Oct. 1, 1976, now abandoned.

BACKGROUND OF THE INVENTION

The present invention relates to a water hammer shock absorber to be installed within the piping for liquid for the purpose to absorb the pressure waves attributed to water hammer.

Absorption of the pressure waves effected by water hammer within the piping arrangement for liquid has hitherto been performed by an accumulator installed onto a pipe at right angle toward outside thereof.

Said accumulator, however, has had such drawbacks that the structural complication thereof naturally invites a high cost of manufacturing and that there is noticeable difficulty in installing process resulting in a very high cost of installation fee.

SUMMARY OF THE INVENTION

An object of the present invention is to provide a water hammer shock absorber which is capable of eliminating all the drawbacks inherent to the conventional shock absorber as above-mentioned and installing thereof at a very low cost as a whole because of simplicity of its construction as well as installation thereof.

Another object of the present invention is to provide a water hammer shock absorber which comprises a casing provided on both side walls thereof with a hole and innerside thereof with a cavity adapted to have a pressurized gas sealed therein, a pipe having a number of small perforations defined on the peripheral wall thereof between said holes of the casing, and an elastic tube covering the peripheral wall of said pipe being fitted thereto in a watertight fashion, and wherein, on occurrence of water hammer within the fluid piping, the pressure waves effected thereby run out through the small perforations toward within the elastic tube covering the pipe in order to stay therein temporally and thereafter said pressure waves become to be automatically absorbed by means of balancing the force of the pressure waves with the sum of elasticity of the tube and the pressing force effected by the pressurized gas surrounding the tube. Therefore, in comparison with the conventional one, said water hammer shock absorber is very far superior in the economical aspect, since it has a very simple construction that invites not only easiness in manufacturing thereof but also simplicity in incorporating thereof with piping arrangement, besides it requires neither specific handling nor particular maintenance, and, in addition, it can serve as a pipe joint itself, also.

Still another object of the present invention is to provide a water hammer shock absorber, wherein the section of said small perforations defined on the periphery of the pipe is the largest in the central portion of the pipe and becomes smaller and smaller successively as it comes apart from the central portion toward both ends of the pipe in order that the tube is deformed by the pressure waves in a smooth convex shape without any strain so as to let the operational life of the tube last longer.

BRIEF DESCRIPTION OF THE DRAWINGS

The appended drawings illustrate the present invention wherein.

DESCRIPTION OF THE PREFERRED EMBODIMENT

Figure 1:
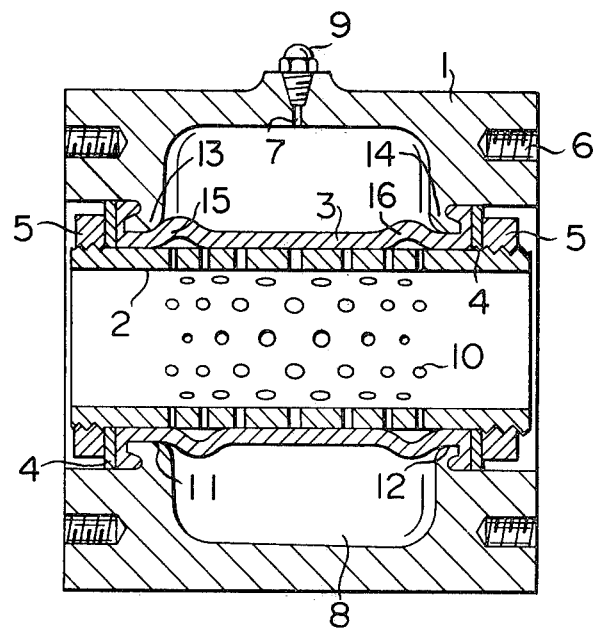
FIG. 1 is a cross-sectional view of a water hammer shock absorber embodying the present invention, when operated normally.

In the drawings, the reference numeral 1 denotes a casing which is provided with a cavity 8 innerside thereof and with a hole 11, 12 on both side walls respectively. Further on both side walls of the casing, there are provided tapped holes 6 for the purpose to have the casing mounted onto the flange of a conduit, etc. (not shown)

There is provided another tapped hole 7 perforated through a portion of the peripheral wall of the casing, and a plug 9 is screwed therein to seal up said hole 7 airtightly.

A number of small perforations 10 are defined on the wall of the pipe positioning between the holes 11 and 12 of the casing. A tube 3 consisted of an elastic material such as rubber, etc. with a tendency to expand in the radial direction thereof covers a pipe 2 being fitted onto the peripheral wall of the pipe in such a manner that said tube 3 is interposed between the pipe 2 and the holes 11 and 12 of the casing to effect a watertight engagement therewith. As shown in the drawings, the casing portion forming the holes 11 and 12 is smoothly curved at the junctures 13, 14 with the cavity 8, where the tube 3 makes contact during expansion, to avoid high localized stress on the tube.

The flange of said elastic tube projecting outwardly from the holes 11 and 12 of the casing is seated onto the outer seat of said holes, whereby the outer side of the flange is pressed through the intermediate of a washer 4, by nuts 5 to be screwed around the pipe to ensure fixation of the tube 3 to the pipe 2. Then, the portion of the tube to come into contact with the inner wall of the cavity 8 is left expanded as seen in FIGS. 1 and 2, for prevention from being cracked.

In a water hammer shock absorber constructed just as above-mentioned, a gas having been pressurized to a prescribed pressure is introduced into the cavity 8 through the tapped hole 7 by removing the plug 9 therefrom and thereafter the plug 9 is screwed into the hole 7 again to seal up said pressurized gas within the cavity 8. (as shown in FIG. 1)

The piping arrangement may be finished up by incorporating a shock absorber which has the pressurized gas sealed into the cavity thereof in a manner wherein both sides thereof are connected with a conduit respectively in a suitable way.

Figure 2:
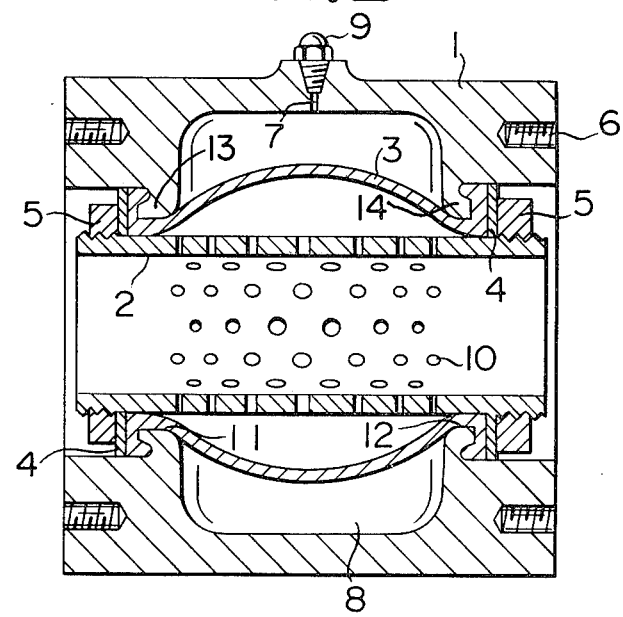
FIG. 2 is a cross-sectional view of the water hammer shock absorber on operation, shown in FIG. 1.

As shown in FIG. 1, in one condition of operation, i.e., without a pressure wave, the tube 3 has annular convex zones 15, 16 within the cavity adjacent each of the two casing openings, which partially conform to the juncture of the adjacent hole 11, 12 with the cavity.

On occurrence of water hammer within the piping, the pressure waves effected thereby are transmitted into said joint so as to let them run out through the small perforations 10 into between the pipe 2 and the tube 3 in order that the pressure waves work to expand the tube outwardly (as seen in FIG. 2) until the force of the pressure waves is counterbalanced by the sum of the elasticity of the tube and gas pressure within said cavity 8.

Such expansion of the tube 3 as above-described achieves absorption of the pressure effected by the pressure waves, and thereafter extinction of the pressure waves induces the fluid within the expanded portion of the tube to run back again into the pipe 2 through the small perforations 10.

In this connection, throughout such operation of the shock absorber, the gas pressure in the cavity 8 should be kept in a proper one in accordance with an expectable pressure waves.

Figure 3:
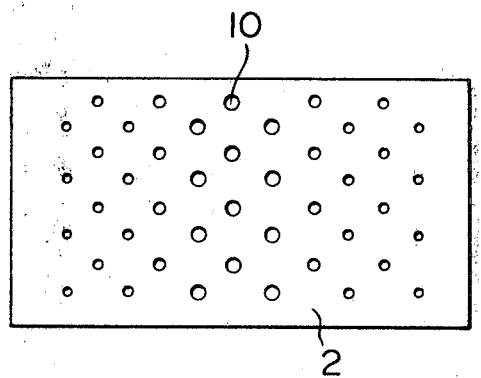
FIG. 3 is an exploded view of a pipe employed in the water hammer shock absorber shown in FIG. 1.

Further, the small perforations of the pipe 2 should be formed in such a fashion that the section of said small perforation is the largest in the central portion of the pipe and becomes smaller and smaller successively as it gets apart from the central portion toward both ends of the pipe (as seen in FIG. 3), in order that the tube is temporally applied with a larger pressure in the central portion and with a smaller one in the portion nearer to both ends, forthe purpose to effect smooth deformation of the tube, as seen in FIG. 2.

Although a particular preferred embodiment of the present invention has been disclosed in detail for illustrative purpose, it will be recognized that variations or modifications of the disclosed shock absorber, including the rearrangement of parts, lie within the scope of the present invention.

What is claimed is:

1. A water hammer shock absorber comprising: a casing forming a cavity adapted to have a pressurized gas sealed therein and provided with two openings, said casing having smoothly curved surface portions at junctures of the openings and the cavity; a pipe extending within the cavity between said two openings and sealed with respect to the casing, said pipe having perforations along its length that vary in area, the total area of said perforations along equal increments of pipe length being greater in a central portion of the pipe and lesser adjacent the two openings of the casing; and an elastic tube covering the perforations of the pipe and sealed about the pipe in a liquid-tight fashion, said tube having annular convex zones within the cavity adjacent each of said two casings openings and a central zone engaging the pipe in one condition of operation, the central zone being expansible in another condition of operation to a position spaced from the pipe, said annular zones being at least partially in contact with the inner wall of the cavity in both said conditions of operation.

2. A water hammer shock absorber as set forth in claim 1 wherein the perforations in a central portion of the pipe are larger than the perforations adjacent the two openings of the casing.

3. A water hammer shock absorber as set forth in claim 2 wherein the perforations are progressively smaller along the length of the pipe in opposite axial directions from the center toward the two openings of the casing.

4. A water hammer shock absorber as set forth in claim 1 wherein said casing has outer seats about the two openings and said elastic tube has a flange at each end projecting through each of said two openings and is seated onto the outer seat, said pipe extends through said openings with the tube interposed between the pipe and casing, and a nut is screwed about extending portions of the pipe at each end in clamping relationship with said tube flange to effect a watertight engagement among the pipe, casing and tube.

* * * * *